E. J. LIENIZ, DEC'D.
L. LIENIZ BEING ADMINISTRATRIX.
SLIDING SIDE LIGHT FOR MOTOR VEHICLES.
APPLICATION FILED MAY 6, 1920.
1,414,783.
Patented May 2, 1922.
2 SHEETS—SHEET 2.
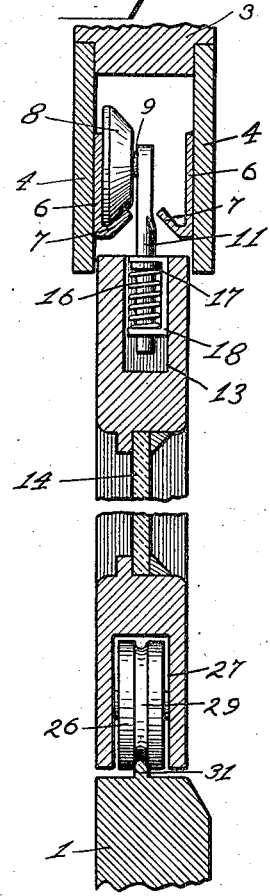
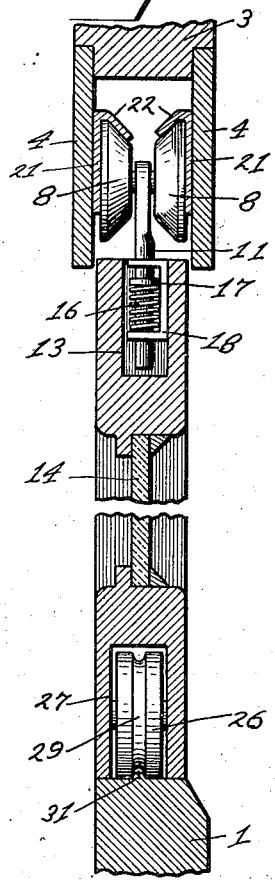
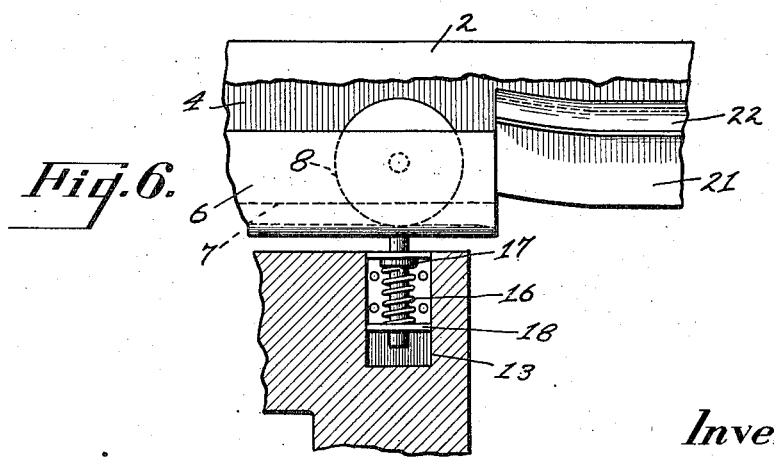
Inventor
EDWARD J. LIENIZ
By Arthur L. Slee
Atty.

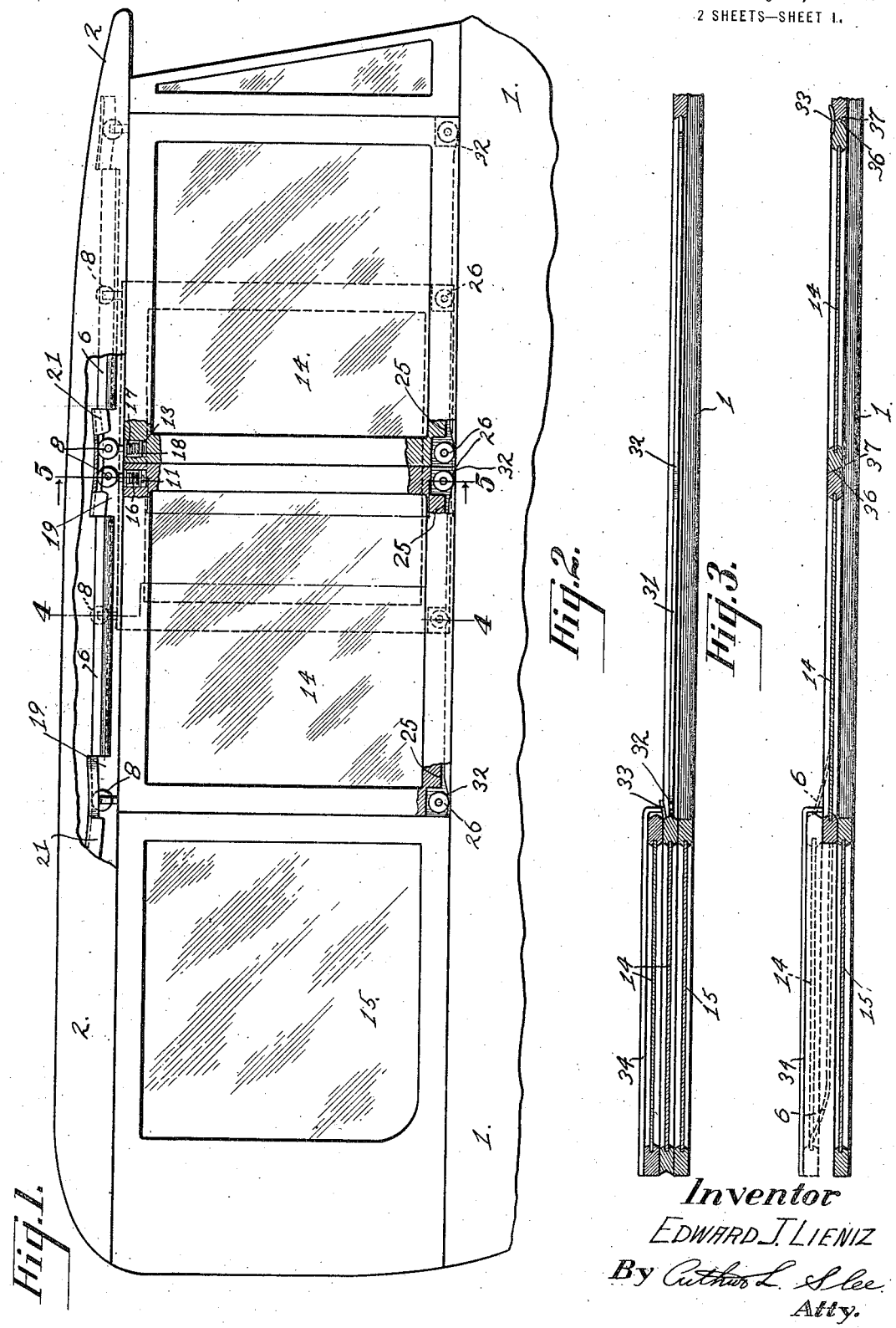

UNITED STATES PATENT OFFICE.

EDWARD J. LIENIZ, OF SAN FRANCISCO, CALIFORNIA; LILLIAN LIENIZ BEING ADMINISTRATRIX OF SAID EDWARD J. LIENIZ, DECEASED.

SLIDING SIDE LIGHT FOR MOTOR VEHICLES.

1,414,783.     Specification of Letters Patent.     Patented May 2, 1922.

Application filed May 6, 1920. Serial No. 380,010.

*To all whom it may concern:*

Be it known that I, EDWARD J. LIENIZ, a citizen of the United States, residing in the city and county of San Francisco, State of California, have invented a new and useful Improvement in Sliding Side Lights for Motor Vehicles, of which the following is a specification.

My invention relates to improvements in sliding window attachments for motor vehicles wherein a plurality of side lights operate in conjunction with upper and lower tracks to guide and support said side lights and to retain the same in an open or closed position as desired.

The objects of my invention are:

First, to provide an improved means for applying sliding side lights to any motor vehicle whereby said side lights may be readily operated to effectively enclose the sides of said vehicle.

Second, to provide improved means for retaining sliding side lights in an open or closed position.

Third, to provide novel means for retaining side lights in alignment with the top edge of the body and with the adjacent window when in closed position, whereby the interior is effectively protected from the elements.

Fourth, to provide improved suspension means whereby movement of the side lights to or from the closed position is greatly facilitated, without impairing the efficiency of the retaining means.

Fifth, to provide an attachment of the character described of a durable character having simple and effective parts, and adapted to be manufactured at a minimum cost.

I accomplish these and other objects by means of the improved device disclosed in the drawings forming a part of the present specification wherein like characters of reference are used to designate similar parts throughout said specification and drawings, and in which—

Fig. 1 is a side elevation of a portion of a motor vehicle provided with my improved sliding side lights, parts being broken away to disclose the application.

Fig. 2 is a cross sectional view of one side of a vehicle, disclosing the sliding side lights in open position.

Fig. 3 is a view similar to Fig. 2 disclosing the sliding side lights extended to the enclosing position.

Fig. 4 is a vertical section taken along the line 4—4 of Fig. 1 with the sliding side lights in the position indicated in dotted lines.

Fig. 5 is a vertical section taken along the line 5—5 of Fig. 1 in the direction indicated.

Fig. 6 is an enlarged side elevation partially in section disclosing the suspending means.

Referring to the drawings the numeral 1 is used to designate in general a motor vehicle provided with a top 2, upon the frame 3 of which is secured a housing 4 open at the bottom thereof.

Tracks 6, provided with upwardly turned edges 7 on the lower portion thereof, are secured interiorly to the walls of the housing 4 forming supporting tracks adapted to receive beveled rollers 8 rotatably mounted upon horizontal shafts 9 upon vertically disposed rods 11 resiliently mounted within a recess 13 in the upper portion of a sliding side light 14 by means of springs 16 engaging collars 17 secured to the rods 11 and a guide 18 mounted within said side lights 14.

The plates 6 are of a length less than the width of the lights 14 and are centrally positioned with respect to side lights 14 when in closed position as disclosed in Fig. 1 of the drawings, thereby providing gaps 19 above registering edges of adjacent lights 14. Within the housing 4 and spanning the gaps 19 between the plates 6, are secured plates 21 provided with downwardly turned edges 22 at the upper portion thereof, forming retaining tracks adapted to engage the upper edges of rollers 8 when advanced beyond the supporting track plates 6. The retaining track plates 21 are upwardly bent at the ends thereof to permit ready movement of the rollers 8 in passing from engagement with the supporting track 6 to the retaining track 21.

The side lights 14 are provided with grooves 25 in the lower edge thereof. Rollers 26 are rotatably mounted within recesses 27 positioned at the corners of the lights 14, the rollers 26 being provided with a groove 29 adapted to straddle a track 31 secured upon the upper edge of the body of the vehicle 1. When in the closed position the track 31 is engaged by the grooves 25 of the side lights 14.

The side lights 14, when not extended to a closed position, are retained in compact position parallel to a rearward side light 15 by a guide rail 34 secured to the body of the vehicle 1, the rearward side light 15 being permanently secured in position. The sliding light 14 centrally positioned when in extended position is supported by inwardly projecting rollers 8 engaging the inner supporting track 6, said inner supporting track plates being inwardly bent at the rearward end thereof to guide said side light to the inward position indicated in dotted lines in Fig. 3 of the drawings. The forward sliding side light 14 is supported by outwardly projecting rollers engaging the outer supporting track 6 said outer track 6 guiding the side light to the central position when in the unextended position. The lower track 31 terminates at a point slightly in advance of the permanent window 15 in order that the sliding side light 14 may be free to lateral movement to the correct relation when in the unextended or open position.

The lower guide track 31 is provided with depressions 32 adapted to receive the lower rollers 26 when the lights 14 are in extended position, thereby permitting the lights to be depressed and retained in close contact with the body of the machine 1, the track 31 being enclosed in a groove 35 provided in the lower portion of the side lights.

A grip strap 33 is provided on the forward sash of the foremost side light by which said light may be gripped when it is desired to move the same.

The resiliently mounted rods 11 carrying the rollers 8 constitutes a novel and efficient means for retaining the sliding side lights 14 in the desired position. During movement from one position to the other the rods 11 are extended to the normal supporting position indicated in Fig. 4 of the drawings, the movement being limited by engagement of the collar 17 secured to the rod 11 with the guide 18 secured within the recess 13 of the side light 14. When in either open or closed position the rollers 8 are engaged by the retaining track plates 21 spanning the gaps 19 between adjacent ends of the supporting track plates 6 thereby depressing the rods 11 and causing a compressive stress to be applied to the springs 16 as the rollers 8 are advanced from the unturned ends of plates 21 to the lower central portion thereof. The stress exerted by the compressed springs 16 is sufficient to hold the lights 14 firmly between the upper and lower tracks thereby retaining said side lights in the desired position. The lower rollers 26 engage the depressions 32 in the lower track 31 simultaneously with the compression of the springs 16, thereby insuring against unintentional displacement of the sliding side lights 14 and giving close contact with the body of the vehicle 1 to prevent rattling.

When it is desired to move the lights 14 from one position to the other it is only necessary to apply sufficient pressure with the hands in the desired direction to overcome the resistance of the compressed springs 16 until the side light has been advanced to engagement with the supporting track 6 whereupon the same is supported clear of the body of the machine and is readily rolled to the desired position.

The supporting and retaining tracks are provided in pairs whereby forward side light 14 may be moved to occupy either extended position independently of movement of the other side lights thereby affording partial enclosure at either position if desired.

The side edges or ends of side lights 14 are provided at one side with a V shaped tongue 36 engaging a suitable V shaped groove 37 provided in the adjacent sash, thereby rendering the enclosure weatherproof when in the extended position.

Having thus described my invention what I claim as new and desire to secure by Letters Patent is:

1. A sliding side light device for motor vehicles comprising a plurality of guide plates having upwardly turned edges upon the lower side thereof, said plates being adapted for attachment to the top of a motor vehicle in longitudinally spaced pairs; a plurality of retaining guide plates having downwardly turned edges upon the upper side thereof mounted in pairs to span the spaces between said supporting tracks; side lights slidably mounted upon said guide tracks; and means for retaining said side lights in an open or closed position.

2. A sliding side light device for motor vehicles comprising a plurality of supporting guide plates adapted for attachment to the top of a motor vehicle in longitudinally spaced pairs; a plurality of retaining guide plates mounted above said supporting guide tracks to span the spaces therebetween, said retaining guides having upwardly inclined ends adjacent the supporting tracks; side lights slidably mounted upon said guide tracks; and means for retaining said side lights in an open or closed position.

3. A sliding side light device for motor vehicles comprising a plurality of pairs of longitudinally spaced pairs of supporting guide tracks adapted for attachment to the top of a motor vehicle; a plurality of retaining guide tracks mounted above the supporting tracks to span the spaces therebetween; a plurality of side lights; rollers mounted upon the upper edge of the side lights to engage said tracks to permit longitudinal movement of said light lights along said tracks; and means for retaining said side lights in an open or closed position.

4. A sliding side light device for motor vehicles comprising a plurality of pairs of longitudinally spaced pairs of supporting guide tracks adapted for attachment to the top of a motor vehicle; a plurality of retaining guide tracks mounted above the supporting tracks to span the spaces therebetween; a plurality of side lights; rollers mounted upon the upper edge of the side lights to engage said tracks to permit longitudinal movement of said side lights along said tracks; lower guide tracks mounted upon the edge of the vehicle body, said lower tracks having depressions formed in vertical alinement with the spaces betwen the supporting tracks; rollers mounted upon the lower edges of the side lights to engage the lower track and arranged to be received by the depression therein whereby the light may be moved longitudinally along said track and lowered into contact with the edge of the body when in a closed position; and means for retaining said side lights in said closed position.

5. A sliding side light device for motor vehicles comprising a plurality of longitudinally spaced pairs of supporting guide tracks adapted for attachment to the top of a motor vehicle forming inner and outer supporting tracks upon each side of said vehicle, the inner track of the two rearward pairs of tracks upon each side being inwardly turned at the end thereof; a permanent side light mounted in the side of the top at the rearward end thereof; an intermediate sliding side light mounted upon the inner supporting guide track and longitudinally movable thereon, the inwardly turned ends of said track being arranged to move said side light transversely into spaced relation to the permanent side light when said intermediate side light is moved to the rear of the vehicle; a forward side light mounted upon the outer supporting guide track and longitudinally movable thereon to occupy a closed position at the forward end of the vehicle top, and an open position between the permanent and the intermediate side light when moved to the rear of the vehicle; and means mounted above the supporting guide tracks and arranged to span the spaces therebetween to engage the sidelights to retain the same in closed position.

6. A sliding side light device for motor vehicles comprising a plurality of longitudinally spaced pairs of supporting guide tracks adapted for attachment to the top of a motor vehicle forming inner and outer supporting tracks upon each side of said vehicle, the inner track of the two rearward pairs of tracks upon each side being inwardly turned at the end thereof; a permanent side light mounted in the side of the top at the rearward end thereof; an intermediate sliding side light mounted upon the inner supporting guide track and longitudinally movable thereon, the inwardly turned ends of said track being arranged to move said side light transversely into spaced relation to the permanent side light when said intermediate side light is moved to the rear of the vehicle; a forward side light mounted upon the outer supporting guide track and longitudinally movable thereon to occupy a closed position at the forward end of the vehicle top, and an open position between the permanent and the intermediate side light when moved to the rear of the vehicle; and retaining guide tracks mounted above the supporting guide track and arranged to span the spaces therebetween to engage the sliding sidelights to retain the same in closed position.

7. A sliding side light device for motor vehicles comprising a plurality of pairs of longitudinally spaced supporting guide tracks adapted for attachment to the top of a motor vehicle, to form inner and outer supporting tracks upon each side of said top; a plurality of retaining guide tracks mounted above the supporting tracks to span the spaces therebetween; intermediate and forward sliding side lights adapted for mounting in the sides of the top; inwardly faced rollers mounted upon the top of said intermediate side lights to engage the inner tracks to move longitudinally thereon; outwardly faced rollers mounted upon the top of the forward side lights to engage the outer tracks for longitudinal movement thereon; and outwardly turned ends formed upon the rearward end of the inner supporting tracks upon each side of the vehicle to move the intermediate side light transversely when moved to an open position at the rear of the top to permit the forward side light to be moved into an open position adjacent and parallel thereto; and means for holding the sidelights between the retaining tracks and the edge of the vehicle for retaining said side lights in a closed position.

8. A sliding side light device for motor vehicles comprising a plurality of pairs of longitudinally spaced supporting guide tracks adapted for attachment to the top of a motor vehicle, to form inner and outer supporting tracks upon each side of said top; a plurality of retaining guide tracks mounted above the supporting tracks to span the spaces therebetween; intermediate and forward sliding side lights adapted for mounting in the sides of the top; inwardly faced rollers mounted upon the top of said intermediate side lights to engage the outer tracks for longitudinal movement thereon; and outwardly turned ends formed upon the rearward end of the inner supporting tracks upon each side of the vehicle to move the intermediate side light transversely when moved to an open position at the rear of the top to permit the forward side light to be moved into an open position adjacent and parallel thereto; lower guide tracks mounted upon the top edge of the body of the vehicle, said tracks having depressions formed therein opposite the retaining tracks; rollers mounted upon the lower edges of the side lights to engage the lower tracks and to be received by the depressions therein to lower said side lights into contact with the edge of the body; and means mounted upon the upper rollers for holding the same in engagement with the retaining tracks to retain the side lights in a closed position.

In witness whereof I hereunto set my signature.

EDWARD J. LIENIZ.